United States Patent [19]

Nakagawa et al.

[11] Patent Number: 4,897,808

[45] Date of Patent: Jan. 30, 1990

[54] ADDER CAPABLE OF USUAL ADDITION AND REVERSE CARRY ADDITION

[75] Inventors: Shin-ichi Nakagawa; Hideyuki Terane; Hiroyuki Kawai; Kazuya Ishihara, all of Itami, Japan

[73] Assignee: Mitsubishi Denki Kabushiki Kaisha, Japan

[21] Appl. No.: 209,682

[22] Filed: Jun. 21, 1988

[30] Foreign Application Priority Data

Jan. 12, 1988 [JP] Japan ................................. 63-5296

[51] Int. Cl.⁴ .............................................. G06F 7/50
[52] U.S. Cl. ................................................... 364/784
[58] Field of Search ............................... 364/784–786, 364/726, 754, 757

[56] References Cited

U.S. PATENT DOCUMENTS 3,482,085 12/1969 Smith, Jr. ............................. 364/784
4,181,976 1/1980 Collins et al. ................... 364/726 X
4,707,800 11/1987 Montrone et al. .................. 364/788
4,718,034 1/1988 Takla et al. .......................... 364/784

FOREIGN PATENT DOCUMENTS 53-60129 5/1978 Japan .

Primary Examiner—Gary V. Harkcom
Assistant Examiner—Tan V. Mai
Attorney, Agent, or Firm—Townsend & Townsend

[57] ABSTRACT

An adder being adapted to switch by a control signal the respective functions of one terminal issuing a carry output and the other terminal given a signal thereto as a carry input, so that the adders for a plurality of bits are used to be realizable of an adding circuit which can perform usual addition and reverse carry addition only by changing the control signal.

6 Claims, 7 Drawing Sheets

ADDER CAPABLE OF USUAL ADDITION AND REVERSE CARRY ADDITION

BACKGROUND OF THE INVENTION

1. Field of the Invention

The present invention relates to an adder with reverse carry system.

2. Description of the Prior Art

Figure 1:
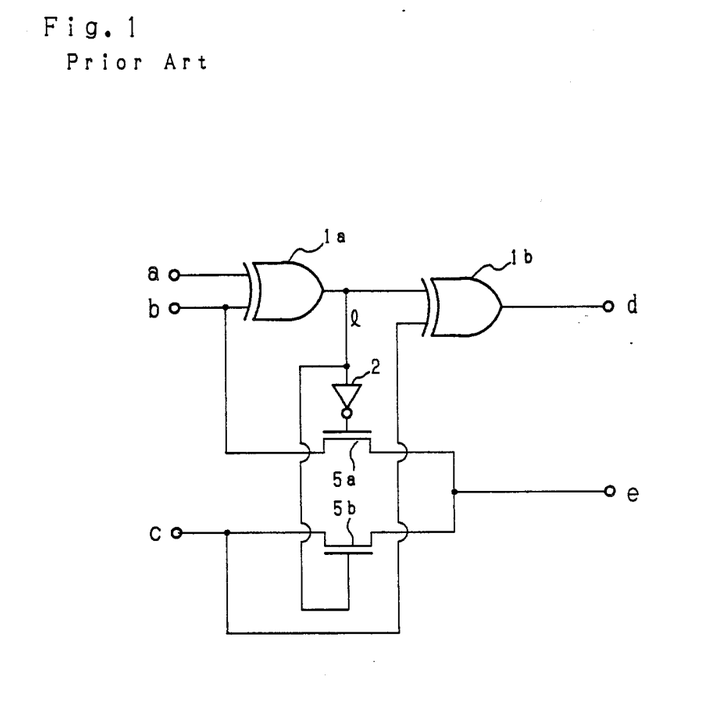
FIG. 1 is a circuit diagram of the conventional adder.

FIG. 1 shows the conventional adder. Two inputs a and b of the add objects are inputted into an exclusive OR gate 1a and an output thereof is given as one input into an exclusive OR gate 1b and also given into an inverter 2, a carry input c being given as the other input into the exclusive OR gate 1b.

The output of the exclusive OR gate 1b is the sum output d.

The inputs b and c are also given to drains of NMOS transistors 5a and 5b, the sources of which are adapted to be connected in batch to obtain an output e, the output of the exclusive OR gate 1a is given to the gate of transistor 5b, the output of the inverter 2 being given to the gate of transistor 5a.

The transistors 5a and 5b serve as a selector for equalizing potential at the terminal of carry output e to that at the terminal of the input b or to that at the terminal of the input c.

Table 1 shows the table of truth value of the adder.

TABLE 1

| Input | | | Carry Output | Sum Output |
|---|---|---|---|---|
| a | b | c | e | d |
| 0 | 0 | 0 | 0 | 0 |
| 1 | 0 | 0 | 0 | 1 |
| 0 | 1 | 0 | 0 | 1 |
| 1 | 1 | 0 | 1 | 0 |
| 0 | 0 | 1 | 0 | 1 |
| 1 | 0 | 1 | 1 | 0 |
| 0 | 1 | 1 | 1 | 0 |
| 1 | 1 | 1 | 1 | 1 |

Figure 2:
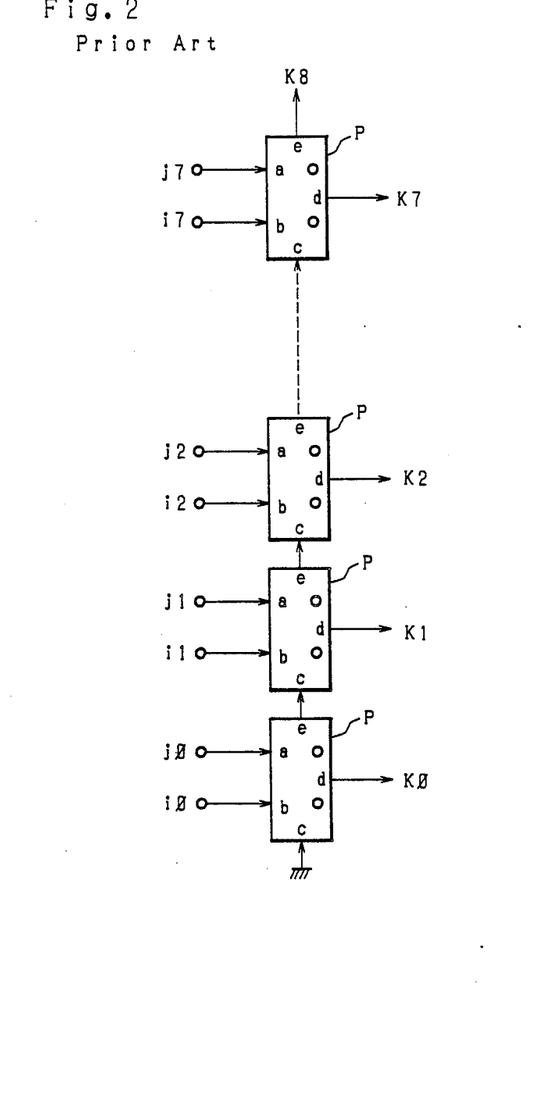
FIG. 2 is a circuit diagram of an adding circuit using the adders shown in FIG. 1.

Referring to FIG. 2, an adding circuit is shown which comprises eight connected adders P shown in FIG. 1, in which reference letters $i_0, i_1, i_2 \ldots i_7$ designate the first inputs for the eight bits and serving as the inputs a for the adders P respectively.

Each carry output e at the lower-order bit side is used as the input c at the higher-order bit side, the input c of the adder P at the lowest-order bit is put at earth potential, and the carry output e at the adder P at the highest-order bit is the carry output K8 of the adding circuit. The sum outputs d of the adders P are outputted as the sum K0, K1, K2 ... K7 of the adding circuit.

Figure 3:
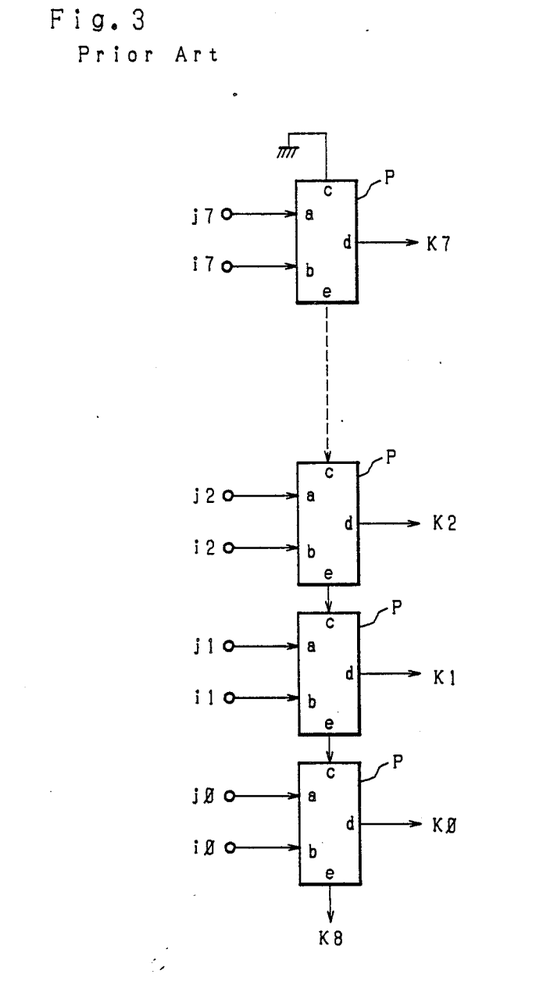
FIG. 3 is a circuit diagram of a bit reverse adding circuit using the same.

The adder P shown in FIG. 1 may carry out bit reverse address computation used in FFT (Fast Fourier Transform). In this case, as shown in FIG. 3, the respective functions of the carry input and carry output are reverse to those shown in FIG. 2 in the circuit structure. The adding circuit shown in FIG. 3 is called the bit reverse adding circuit. In detail, the carry output e at the higher-order bit side is connected to the carry input c at the lower-order bit side, the input c at the highest-order bit is put earth potential, the carry output e at the lowest-order bit is used as the carry output K8.

The inputs $i_0, i_1, i_2 \ldots i_7$ and $j_0, j_1, j_2 \ldots j_7$ to be added are called the base addresses. In a case where FFT for 8 points at the base addresses $i_7 \ldots i_2, i_1, i_0 = (10000000)_2$, the base addresses $j_7 \ldots j_2, j_1, j_0 = (00000100)_2$ are sequentially added.

The sum output in the above case is as follows:

| Number of Addition Times | K7 | | | | K2, | K1, | K0 |
|---|---|---|---|---|---|---|---|
| 0 | 1 | 0 | 0 | 0 | 0 | 0 | 0 |
| 1 | 1 | 0 | 0 | 0 | 1 | 0 | 0 |
| 2 | 1 | 0 | 0 | 0 | 0 | 1 | 0 |
| 3 | 1 | 0 | 0 | 0 | 1 | 1 | 0 |
| 4 | 1 | 0 | 0 | 0 | 0 | 0 | 1 |
| 5 | 1 | 0 | 0 | 0 | 1 | 0 | 1 |
| 6 | 1 | 0 | 0 | 0 | 0 | 1 | 1 |
| 7 | 1 | 0 | 0 | 0 | 1 | 1 | 1 |

Thus, the bit reverse address at FFT is obtained.

Since the conventional adder is constructed as shown in FIG. 1, when the bit reverse address computation is carried out, the circuit shown in FIG. 2 cannot cope with the bit reverse computation, whereby an exclusive circuit as shown in FIG. 3 is required to be prepared.

SUMMARY OF THE INVENTION

In order to solve the above problem the present invention has been designed.

A first object thereof is to provide an adder adapted to switch the respective functions of the usual addition and reverse carry addition.

A second object of the invention is to provide an adding circuit of a plurality of bits and adapted to switch the respective functions of the usual addition and reverse carry addition, thereby expecting to save the hardware.

The above and further objects and features of the invention will more fully be apparent from the following detailed description with accompanying drawings.

DESCRIPTION OF THE PREFERRED EMBODIMENTS

Next, an embodiment of an adder and an adding circuit using it will be detailed in accordance with the accompanying drawings.

Figure 4:
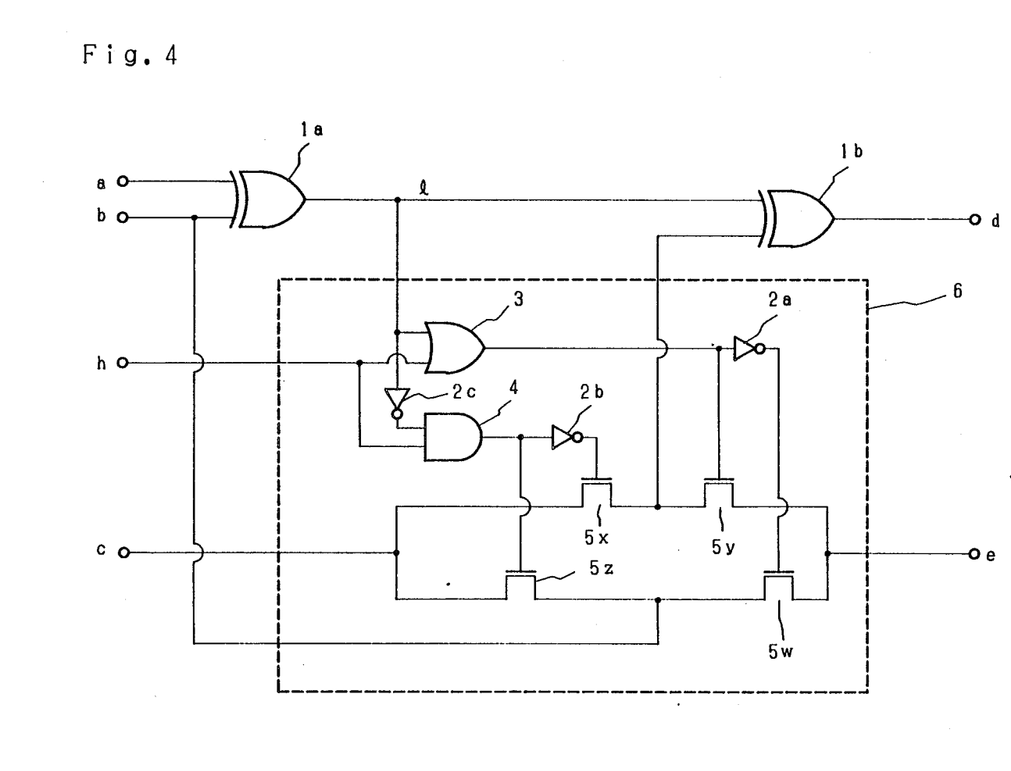
FIG. 4 is a circuit diagram of an adder of the invention.

FIG. 4 shows a first embodiment of the adder of the invention, in which a reference numeral 6 designates a carry input-output switching circuit. Two inputs a and b of the addition objects, in other words, an addend and an augend, are, in the same way as conventional one, given to an exclusive OR gate 1a, so that the output thereof is one input of an exclusive OR gate 1b and the output thereof is the sum output d, h designates a mode switching signal, which, when it is a logical "0" becomes a usual addition mode with the terminal c being a carry input terminal and the terminal e a carry output terminal, and which, when a logical "1", becomes a reverse carry mode with the terminal c being a carry output terminal and the terminal d a reverse carry mode. In other words, between the terminals c and e, a series circuit of NMOS transistors 5x and 5y and that of NMOS transistors 5z and 5w are connected in parallel to each other, an intermediate mode of the former being connected to the other input terminal at the exclusive OR gate 1b, that of the latter being given the input b. A switching circuit comprising an OR gate 3, an AND gate 4 and inverters 2a, 2b and 2c controls switching of the transistors 5x, 5y, 5z and 5w. In other words, the output of the exclusive OR gate 1a and mode switching signal are inputted into the OR gate 3, and the output thereof is given directly to the gate of transistor 5y and through the inverter 2a to the gate of transistor 5w. The mode switching signal h and the output signal of the exclusive OR gate 1a inverted by the inverter 2c are inputted into the AND gate 4 and the output thereof is given directly to the gate of transistor 5z and through the inverter 2b to the gate of transistor 5x.

Next, explanation will be given on the adder of the invention constructed as the above-mentioned.

When h="0" (low level), the output of AND gate 4 is surely a logical "0", whereby the transistor 5z is off and that 5x on. As a result, the terminal c connects with the input terminal at the exclusive OR gate 1b. On the other hand, since the mode switching signal h: one input to the OR gate 3, is a logical "0", the output of the OR gate 3 is determined by the output of the exclusive OR gate 1a, and the output of the OR gate 3 turns the respective transistors 5w and 5y corresponding to "0" or "1".

In other words, the transistors 5w and 5y correspond to those 5a and 5b at the circuit shown in FIG. 1. Accordingly, the terminal e is the carry output terminal and the terminal c, the carry input terminal. The table of truth value of the circuit of the invention, when h=0, is the same as Table 1 as shown in Table 2.

TABLE 2

| Input | | | | Output |
|---|---|---|---|---|
| h | l | b | c | e |
| 0 | 0 | 0 | 0 | 0 |
| 0 | 0 | 0 | 1 | 0 |
| 0 | 0 | 1 | 0 | 1 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |

In addition, in the Table 2, designates an output of exclusive OR gate 1a.

As above-mentioned, the usual addition is carried out by assuming h=0.

On the contrary, when h="1" (high level), the output of OR gate 3 is always a logical "1", whereby the transistor 5y is on and that 5w is off to result in that the terminal e connects with the input terminal of the exclusive OR gate 1b.

On the other hand, the mode switching signal h: one input of the AND gate 4, is a logical "1", whereby the output thereof is determined by the output of the exclusive OR gate 1a, whereby the respective transistors 5z and 5x are on corresponding to "0" or "1" of the output of gate 1b.

The transistors 5z and 5x correspond to the transistors 5a and 5b in FIG. 1 respectively. In this case, when the transistor 5z is on, the input b is issued to the terminal c through the transistor 5z and, when the transistor 5x is on, the terminals c and e are connected with each other.

In brief, the terminal c becomes a carry input terminal, and carry e, a carry output terminal. Namely, the reverse carry addition is performed by assuming h=1. The table of truth value in this case is shown in Table 3.

TABLE 3

| Input | | | | Output |
|---|---|---|---|---|
| h | l | b | c | e |
| 1 | 0 | 0 | 0 | 0 |
| 1 | 0 | 0 | 1 | 0 |
| 1 | 0 | 1 | 0 | 1 |
| 1 | 0 | 1 | 1 | 1 |
| 1 | 1 | 0 | 0 | 0 |
| 1 | 1 | 0 | 1 | 1 |
| 1 | 1 | 1 | 0 | 0 |
| 1 | 1 | 1 | 1 | 1 |

Figure 5:
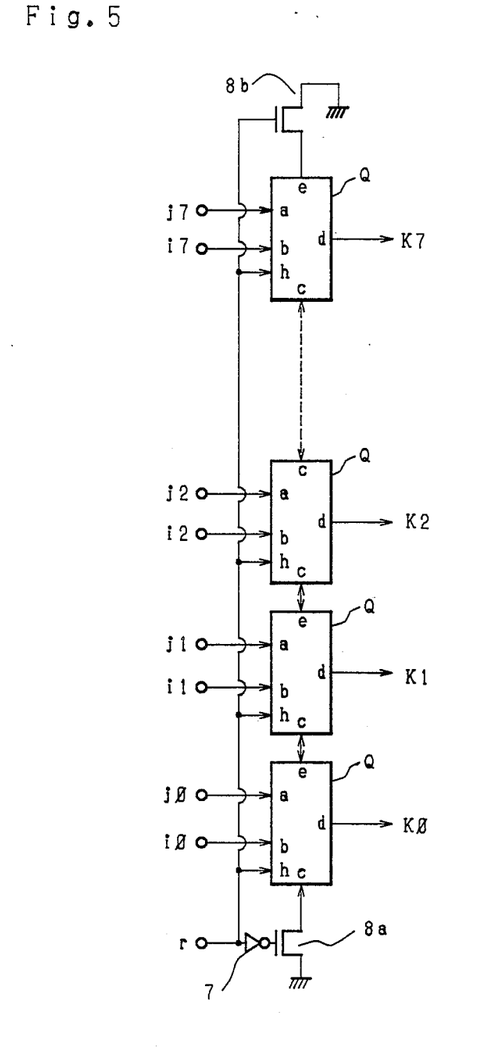
FIG. 5 is a circuit diagram of an adding circuit of the invention using the adders shown in FIG. 4.

FIG. 5 shows a bit reverse adding circuit connecting eight adders Q of the invention, in which $i_0, i_1, i_2 \ldots i_7$ are the first inputs of eight bits and serve as the inputs b at the respective adders Q, and $j_0, j_1, j_2 \ldots j_7$ are the second inputs of eight bits and serve as the input a of the respective adders Q. The sum output d of each adder Q are represented by the sum, K0, K1, K2 ... or K7 of the adding circuit.

Furthermore, the terminal e at the lower-order bit side is connected with the terminal c at the higher-order bit side, the terminal e of the adder Q at the highest-order bit connecting to ground potential through a switching transistor 8b. The terminal c of the adder Q at the lowest-order bit connects with ground potential through a switching transistor 8a. An input terminal r for the mode switching signal connects with the input terminal for the mode switching signal h at each adder Q and directly to the gate at the switching transistor 8b and through an inverter 7 to the gate at the switching transistor 8a.

When the signal to be inputted into the terminal r is a logical "0", although the switching transistor 8a is on and the terminal c at the adder Q of the lowest-order bit is at the earth level, the switching transistor 8b is off and the terminal e at the adder Q of the highest-order bit becomes high impedance and also at each adder the terminal c becomes the carry input terminal and that e the carry output terminal due to h="0". Hence, in this case, the circuit functions as the usual adding circuit in the same way as that shown in FIG. 2.

On the contrary, when the signal to be inputted into to the terminal r is a logical "1", the switching transistor 8a is off and that 8b is on and the terminal c is the carry output terminal and that e the carry input terminal, the circuit functions as the bit reverse adding circuit shown in FIG. 3.

Figure 6:
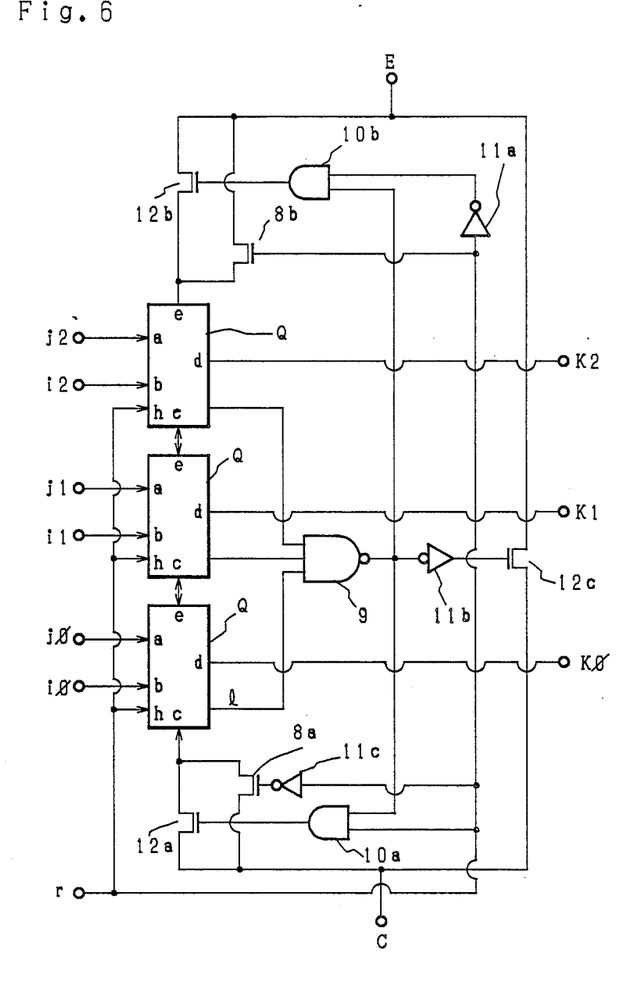
FIG. 6 is a circuit diagram of an adding circuit of a look ahead system.

Referring to FIG. 6, the adder of the invention applied to a carry look ahead system adding circuit (when 3 bits) is shown, in which the exclusive logical sum l of the two inputs a and b at each adder is used to be inputted into a three-input NAND gate 9 and the output thereof is given to the gate at the transistor 12c through an inverter 11b, the output of NAND gate 9 being one-input of the respective AND gate 10a and 10b. The mode switching signal input terminal r is connected with the input terminal for the mode switching signal h at each adder Q and the other input terminal at the AND gate 10a, and the other input terminal at the AND gate 10b through an inverter 11a. A transistor 12a is interposed between the terminal c at the adder Q of the lowest-order bit and one output terminal C of this circuit, a transistor 12b is interposed between the terminal e at the adder Q of the highest-order bit and the other output terminal E of the present circuit, and the gates at both transistors 12a and 12b are given the outputs of the AND gates 10a and 10 b. In addition, the transistor 12c is interposed between the output terminals C and E.

The transistor 8a connects in parallel to the transistor 12a and that 8b in parallel to the transistor 12b, the terminal r connecting directly to the gate of the transistor 8b and through an inverter 11c to the gate of transistor 8a.

When the signal of "0" is inputted into the terminal r, the mode switching signal h="0" allows the adder to carry out usual addition and, when the signal of "1" is inputted, to carry out the bit reverse addition. Now, when r="0", the transistor 8a is on and the terminal c at the adder Q of the lowest-order bit connects with the terminal C. While the output of NAND gate 9 is a logical "1", the output of AND gate 10b puts the transistor 12b on and the terminal e at the adder Q of the highest-order bit connects with the terminal E. When the outputs 1 of the exclusive OR gates at the adders Q entirely become logical "1", the carry output is obtained from the 3-bit adding circuit. In the present circuit, however, the transistor 12c is on so as to directly transmit the carry output to the terminal E side without propagation by each adder, so that the carry generation is transmitted at high speed to the adding circuit at the higher-order or lower-order bit side of the same circuit structure.

When the mode switching signal h="1", conversely the carry output is transferred to the terminal C side.

Figure 7:
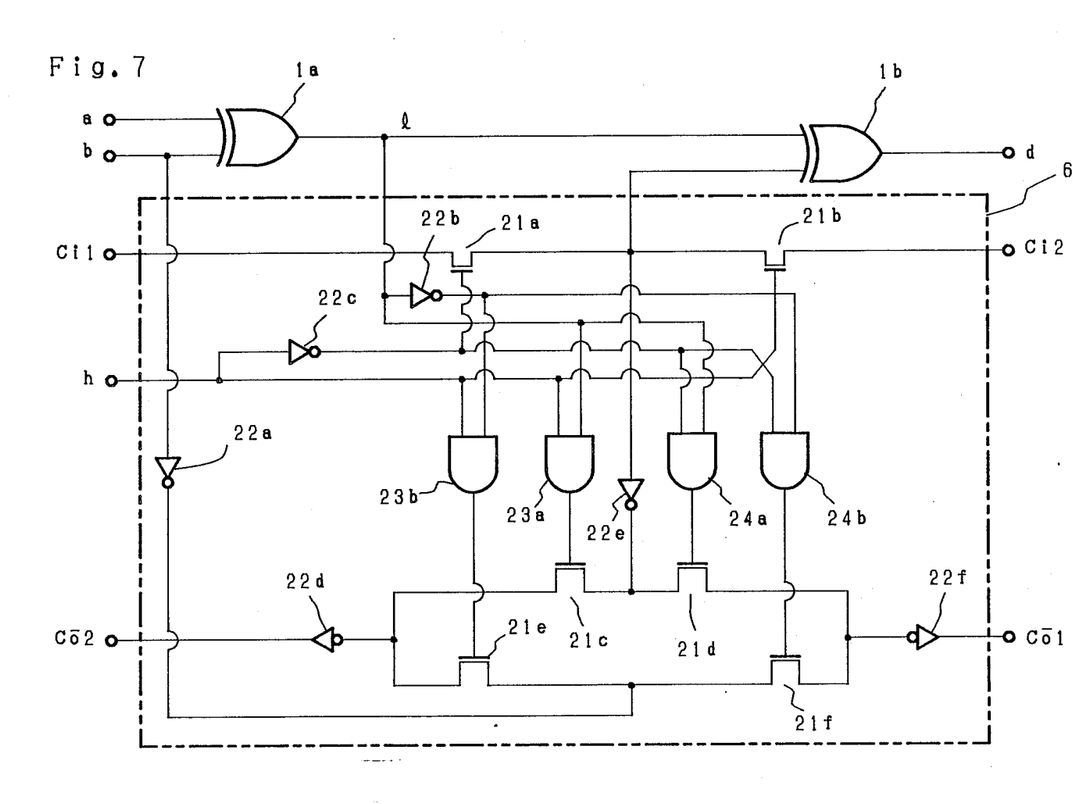
FIG. 7 is a circuit diagram of a modified embodiment of the adder of the invention.

Referring to FIG. 7, a second embodiment of the adder of the invention is shown, in which the respective functions of the carry input terminal and carry output terminal are not changed by the mode, as shown in the first embodiment, but is provided with exclusive carry input and carry output terminals corresponding to both the modes.

A carry input-output switching circuit 6 comprises switching transistors 21a, 21b . . . , inverters 22a, 22b . . . , and AND gates 23a, 23b, 24a and 24b, the transistors 21a and 21b being connected in series between two input terminals Ci1 and Ci2. Between two output terminal Co1 and Co2 are interposed a bridge circuit of four transistors 21c, 21d, 21e and 21f and inverters 22d and 22f. The input b is given through the inverter 22a to the node of the transistors 21e and 21f. Between the node of transistors 21c and 21d and that of transistors 21a and 21b is interposed an inverter 22e, the node of transistors 21a and 21b being connected to one input at an exclusive OR gate 1b. The output 1 of an exclusive OR gate 1a given the inputs a and b connects to the other input of the exclusive OR gate 1b and is also given directly to the AND gates 23a and 24a and through the inverter 22b to the AND gates 23b and 24b. The mode switching signal h is given directly to the gate of transistor 21b and AND gates 23a and 23b and through the inverter 22c to the AND gates 24a and 24b and further to the gate of transistor 21a.

When the mode switching signal h is a logical "0" in this circuit, the transistor 21a is on and the transistors 21b, 21c and 21e are off. Hence, this circuit functions as the circuit in which Ci1 is the carry input and Co1 is the carry output. In other words, Ci1 is the input of the exclusive OR gate 1b through the transistor 21a.

When the output 1 of the exclusive OR gate 1a is a logical "1", the output of AND gate 24a turns on the transistor 21d, whereby the output of AND gate 24a turns on the transistor 21d. Hence, the carry input from the terminal Ci1 is outputted to the terminal Co1 via the transistor 21a, inverter 22e, transistor 21d and inverter 22f. When 1 is a logical "0", the output of AND gate 24b turns on the transistor 21f and the input b is outputted to the terminal Co1 via the inverter 22a, transistor 21f and inverter 22f.

Conversely, when the mode switching signal h is a logical "1", the transistor 21b is on and those 21a, 21d and 21f are off, whereby Ci2 becomes the carry input terminal, and Co2, the carry output terminal. In other words, the input to Ci2 becomes one input to the exclusive OR gate 1b. When is a logical "1", the output of AND gate 23a turns on the transistor 21c, whereby the input to Ci2 is transmitted to the terminal Co2 via the transistor 21b, inverter 22e, transistor 21c and inverter 22d. When is a logical "0", the output of AND gate 23b turns on the transistor 21e, the input b is transmitted to the terminal Co2 via the inverter 22a, transistor 21e and inverter 22d.

As seen from the above, the second embodiment of the adding circuit of the invention is advantageous in that a peripheral circuit and control thereof are simplified.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An adder provided with a carry signal input and a carry signal output and operating addition for one bit, comprising a carry input-output switching circuit disposed between said carry signal input and said carry signal output which switches between usual addition and reverse carry addition in response to a predetermined control signal, said switching circuit for receiving a first carry signal on said carry signal input and for outputting a second carry signal on said carry signal output.

2. An adder comprising:
a first exclusive OR gate having a first input for receiving an addend, a second input for receiving an augend, and an output;
a second exclusive OR gate which receives the output of the first exclusive OR gate as one input and issues a sum output; and
a carry input-output switching circuit for switching a carry output and a carry input, said carry input-output switching circuit including,
a bridge circuit comprising four switching elements connected in a bridge configuration, so that said carry input and said carry output are connected to an opposing pair of nodes, wherein an addend or an augend is given to one node of the opposing pair of nodes, and the other node thereof is used as the other input of said second exclusive OR gate, and a logical circuit which turns said switching elements on or off in response to a combination of a mode switch control signal and the output of said first exclusive OR gate wherein, said carry output and said carry input are alternatively connected to said other input terminal of said second exclusive OR gate, and the addend or the augend is transmitted to said carry output and said carry input, and said carry output and said carry input are connected or disconnected respectively.

3. An adder comprising:
a first exclusive OR gate for receiving an addend on a first input and an augend on a second input and
a carry input-output switching circuit having first and second outputs for issuing a carry output and first and second inputs for receiving a carry signal, so that a predetermined control signal selects said first carry output and first carry input, or said second carry output and said second carry input, said carry input-output switching circuit including,
a bridge circuit having four switching elements so that said first carry output connects to a first node, said second carry output connects to a second node, data regarding the addend or the augend is given to a third node, and signals at said first and second carry inputs are selected to be transmitted to a fourth node, and
a logical circuit which turns on or off said switching elements in response to said control signal in combination with the output of said first exclusive OR gate, so to select the addend or the augend to be input to said first or second carry output, to select transmission of said first or second carry input to said other input of said second exclusive OR gate, and to connect said first carry input to said first carry output, or said second carry input to said second carry output.

4. An adding circuit for a plurality of bits comprising:
a carry input-output switching circuit provided with first and second terminals for inputting or outputting a carry signal and disposed between said first and second terminals and for switching by a predetermined control signal the respective functions of a terminal issuing a carry output and a terminal given a signal as the carry input; and comprising a plurality of adders each operating addition for one bit, so that first and second terminals at each of said adders connect with second and first terminals at each of said adders for adding adjacent bits and a common control signal is given to each of said adders.

5. An adding circuit for a plurality of bits comprising:
a first exclusive OR gate having a first input for receiving an addend, a second input for receiving an augend, and an output;
a second exclusive OR gate having a first input for receiving the output of said first exclusive OR gate, a second input, and an output for issuing a sum output; and
a carry input-output switching circuit which is disposed between first and second terminals inputting or outputting a carry signal and switches in response to a predetermined control signal the respective functions of one terminal of said first and second terminals issuing the carry output and the other terminal given a signal as the carry input, said carry input-output switching circuit having a bridge circuit which comprises four switching elements connected in a bridge configuration, such that said first and second terminals are connected to a pair of opposing nodes, the addend or the augend is transmitted to one node of the opposing pair of nodes, and the other node thereof is connected to the other input terminal of said second exclusive OR gate; and
a logical circuit which controls said switching elements on or off by said control signal and output of said first exclusive OR gate, selectively connects first and second terminals to the other input terminal of said exclusive OR gate, selectively gives the addend or the augend to first or second terminal, and connects or disconnects said first and second terminals wherein said adding circuit comprises a plurality of adders operating addition for one bit so that first and second terminals at each of said adders connect with second and first terminals at each of said adders for adding adjacent bits and a common control signal is adapted to be given to each of said adders for adding said bits 6. An adding circuit comprising:
a first exclusive OR gate having a first input for receiving an addend, a second input for receiving an augend, and an output;
a second exclusive OR gate having a first input for receiving the output of said first exclusive OR gate, a second input, and an output for issuing a sum output; and
a carry input-output switching circuit disposed between first and second terminals for inputting or outputting a carry signal, switches in response to a predetermined control signal the respective functions of one terminal of said first and second terminals issuing the carry output and the other terminal given a signal as the carry input, said carry input-output switching circuit including
a bridge circuit which comprises four switching elements connected in a bridge configuration wherein said first and second terminals are connected to an opposing pair of nodes, such that the addend or the augend is transmitted to one node of the opposing pair of nodes, and the other node thereof is connected to the other input terminal of said second exclusive OR gate, and
a logical circuit which turns said switching elements on or off in response to said control signal in combination with said output of said first exclusive OR gate, selectively connects first and second terminals to said other input terminal at said second exclusive OR gate, selectively gives the addend or the augend to said first or second terminal, and connects or disconnects said first and second terminals, said adding circuit comprising a plurality of adders for operating addition for one bit so that first and second terminals of each of said adders connect with second and first terminals at each of said adders for adding adjacent bits, and a common control signal is transmitted to each of said adders for adding said bits, and further being provided with a circuit which inspects coincidence of the outputs of said first exclusive OR gates with those of said adders for adding said bits so that said coincident output is taken as the carry output of said adding circuit.

* * * * *